United States Patent [19]

Endo

[11] Patent Number: 5,042,020

[45] Date of Patent: Aug. 20, 1991

[54] INFORMATION RECORDING AND/OR REPRODUCING APPARATUS WITH AN OPTICAL MEDIUM SENSOR FOR PROVIDING AUTOMATIC VARIATION IN LIGHT BEAM INTENSITY IN ACCORDANCE WITH VARIOUS RECORDING MEDIUM

[75] Inventor: Kiyonobu Endo, Yokohama, Japan

[73] Assignee: Canon Kabushiki Kaisha, Tokyo, Japan

[21] Appl. No.: 374,626

[22] Filed: Jun. 30, 1989

Related U.S. Application Data

[63] Continuation of Ser. No. 838,443, Mar. 10, 1986, abandoned, which is a continuation of Ser. No. 554,370, Nov. 22, 1983, abandoned.

[30] Foreign Application Priority Data

| Nov. 27, 1982 | [JP] | Japan | 57-206905 |
| Nov. 27, 1982 | [JP] | Japan | 57-206906 |
| Nov. 27, 1982 | [JP] | Japan | 57-206907 |
| Nov. 27, 1982 | [JP] | Japan | 57-206908 |

[51] Int. Cl.$^5$ ............................ G11B 7/085
[52] U.S. Cl. ............................ 369/44.31; 369/58; 369/116; 369/120
[58] Field of Search ............. 369/13–15, 369/32–33, 41, 54, 58, 100, 106, 116, 120, 124, 126, 44.26, 44.29, 44.31, 44.35, 44.36; 360/25, 31, 46, 60, 65, 68

[56] References Cited

U.S. PATENT DOCUMENTS

| 1,999,556 | 4/1935 | Balsley | 369/116 X |
| 2,242,638 | 5/1941 | Balsley | 369/116 X |
| 3,588,380 | 6/1971 | Horlander et al. | 360/25 |
| 3,601,558 | 8/1971 | Sugaya et al. | 360/25 |
| 4,038,692 | 7/1977 | Umeda et al. | 360/65 X |
| 4,093,961 | 6/1978 | Kanamaru | 369/54 |
| 4,312,020 | 1/1982 | Hasegawa | 360/65 |
| 4,328,506 | 5/1982 | Yoshida et al. | 369/116 X |
| 4,338,682 | 7/1982 | Hosaka et al. | 369/44 |
| 4,357,643 | 11/1982 | d'Alayer de Costemore d'Arc | 369/58 X |
| 4,426,693 | 1/1984 | Satoh et al. | 369/116 X |
| 4,433,349 | 2/1984 | Kimura | 360/31 X |
| 4,467,462 | 8/1984 | Shibata | 369/44 X |
| 4,484,237 | 11/1984 | Muto | 360/25 |
| 4,491,940 | 1/1985 | Tinet | 369/44 X |
| 4,497,049 | 1/1985 | d'Alayer de Costemore d'Arc | 369/54 X |
| 4,507,767 | 3/1985 | Takasugi | 369/54 |
| 4,509,156 | 4/1985 | Okara et al. | 369/54 |
| 4,539,662 | 9/1985 | Hatano et al. | 369/45 X |
| 4,544,838 | 10/1985 | Musha et al. | 369/44 X |
| 4,553,179 | 11/1985 | Inami et al. | 360/25 X |
| 4,554,651 | 11/1985 | Kanai et al. | 360/60 X |
| 4,613,912 | 9/1986 | Shibata et al. | 360/19.1 |

Primary Examiner—Roy N. Envall, Jr.
Assistant Examiner—W. R. Young
Attorney, Agent, or Firm—Fitzpatrick, Cella, Harper & Scinto

[57] ABSTRACT

An information recording and/or reproducing apparatus in which a beam emitted from a light source is applied to an optical recording medium to thereby record and/or reproduce information thereon has a light projecting device for projecting a medium-detecting-light flux onto the surface of the optical recording medium, a discriminating device for detecting the level of the reflected light or the transmitted light of the medium-detecting-light flux from the optical recording medium and discriminating between optical recording mediums different in characteristic by the detected level, and an intensity changing device for changing the intensity of the beam on the surface of the optical recording medium in accordance with the determination of the discriminating device.

21 Claims, 7 Drawing Sheets

INFORMATION RECORDING AND/OR REPRODUCING APPARATUS WITH AN OPTICAL MEDIUM SENSOR FOR PROVIDING AUTOMATIC VARIATION IN LIGHT BEAM INTENSITY IN ACCORDANCE WITH VARIOUS RECORDING MEDIUM

This application is a continuation of application Ser. No. 06/838,443 filed Mar. 10, 1986, now abandoned, which is a continuation of application Ser. No. 06/554,370 filed Nov. 22, 1983, now abandoned.

BACKGROUND OF THE INVENTION

1. Field of the Invention

This invention relates to an information recording or reproducing apparatus for recording and/or reproducing information by the use of an optical recording medium capable of recording information thereon with the aid of light energy. The present invention covers an apparatus for effecting recording only or reproduction only and an apparatus for effecting both recording and reproduction.

2. Description of the Prior Art

Microfilms, video discs, digital audio discs, DRAW (direct read after write) systems, etc. are known as applications of an optical recording system. What has particularly been attracting attention in recent years is the application of optical recording systems to information file systems, namely, the DRAW system using an optical recording medium in which a laser light or the like is stopped down into a minute spot on the optical recording medium and a thin film of metal such as Te or Bi is evaporated to form pits in the optical recording medium.

A feature of the DRAW system is that recording and addition of recording are possible on the part of the user. Also, information recorded on an optical recording medium by pit formation is unerasable and cannot be repetitively recorded, it resists aging well and can be said to be best suited for long-time preservation.

On the other hand, recently, research and development of erasable, optical recording mediums including magneto-optical materials such as lower-oxidized-state tellurium, MnBi, GdTbFe, GdCO, GdFeCO, GdDyFe, GdTbFeCO, etc. have been announced. Erasable optical recording mediums have the merit of permitting repeated recording, while they have the disadvantages of being inferior in stability of the recorded information when preserved for a long period of time, that is, they do not resist aging well.

Accordingly, it is desirable to make the best use of the merits of the two types of optical recording mediums, that is, to use the unerasable optical recording mediums for an information file intended for long-time preservation and to use the erasable recording mediums for a short period of time or for temporary information files. An example of application of the information files for long-time preservation is the field in which conventional microfilm has been used, and an example of the application of the short-time or temporary information file are buffer memories or the like of printers, etc.

However, these optical recording mediums generally differ in recording sensitivity and thus, there is no example of apparatus in which recording and/or reproduction can be effected on optical recording mediums having different characteristics, and it has been impossible to effect information filing in the same apparatus by making the best use of the merits of optical recording mediums different in characteristic.

SUMMARY OF THE INVENTION

It is an object of the present invention to provide an information recording or reproducing apparatus which can record and/or reproduce information on optical recording mediums having different characteristics.

It is another object of the present invention to provide an information recording or reproducing apparatus which can record and/or reproduce information on any of optical recording mediums having different characteristics and moreover can make the characteristics of automatic focus control and tracking control constant.

The present invention achieves the above objects by an information recording or reproducing apparatus in which a beam emitted from a light source is applied to an optical recording medium to thereby record and/or reproduce information thereon, characterized by light projecting means for projecting a medium detecting light flux onto the surface of the optical recording medium, discriminating means for detecting the level of the reflected light or the transmitted light of the medium detecting light flux from the optical recording medium and discriminating between optical recording mediums different in characteristic by the detected level, and intensity changing means for changing the intensity of the beam on the surface of the optical recording medium in accordance with the discrimination of the discriminating means.

The invention will become completely apparent from the following detailed description thereof taken in conjunction with the accompanying drawings.

DESCRIPTION OF THE PREFERRED EMBODIMENTS

Figure 1:
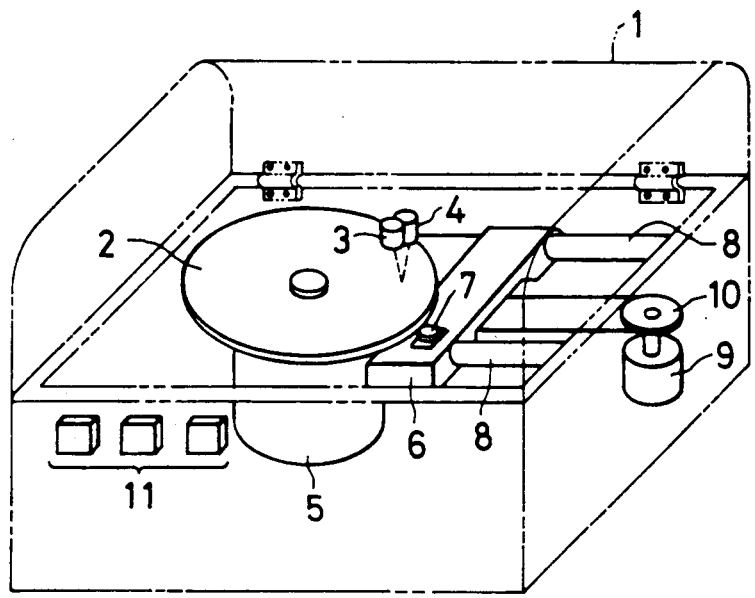
FIG. 1 schematically shows a first embodiment of the information recording or reproducing apparatus of the present invention.

FIGS. 1 to 5 show a first embodiment of the present invention, FIG. 1 being a schematic view thereof. Reference numeral 1 designates a cover. Setting of an optical recording medium 2 may be effected by opening-closing of the cover 1. Reference numeral 3 denotes a light projecting device such as a light-emitting diode, and reference numeral 4 designates a light receiver for receiving reflected light. The light receiver 4, together with the light projecting device 3, is mounted on the back side of the cover 1. Reference numeral 5 denotes a motor for rotating the optical recording medium, 2 at a predetermined number of revolutions per minute. Reference numeral 6 designates a head portion in which a lens 7 for forming a minute spot on the surface of the optical recording medium 2, a light source, an astigmatic optical, system, a four-division photodetector, etc. to be described hereinbelow are disposed. The head portion may be moved along a guide bar 8 by a motor 9 and a pulley mechanism 10. Reference numeral 11 designates a manually operated operating button capable of changing over the recording or the reproduction.

Figure 2:
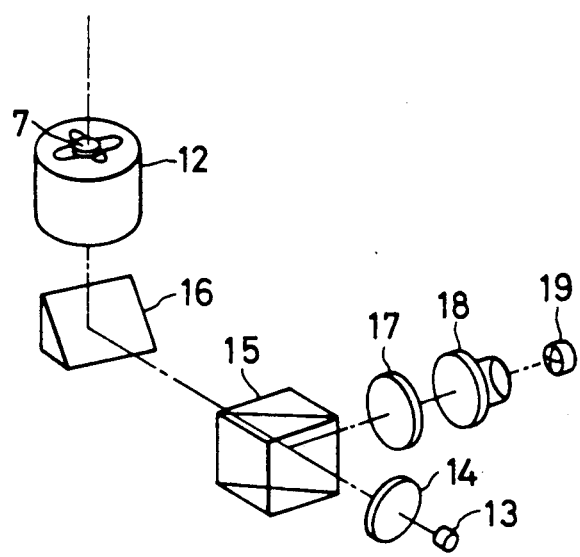
FIG. 2 is a schematic view showing the optical system of the first embodiment.

FIG. 2 shows an optical system in the head portion 6. Designated by 12 is an actuator provided with a mechanism for moving the lens 7 in the direction of the optic axis to effect automatic focus control and a mechanism for moving the lens 7 back and forth and to left and right to effect tracking and time axis correction. Reference numeral 13 denotes a light source such as a semiconductor laser. The beam of the light source 13 is made into a desired light flux distribution by a collimation lens 14, passes through a beam splitter 15 and is reflected and deflected by a total reflection mirror 16. Reference numeral 17 designates a polarizing plate through which the light flux divided by the beam splitter 15 passes, reference numeral 18 denotes an astigmatic optical system comprising, for example, a spherical lens and a cylindrical lens, and reference numeral 19 designates a four-division photodetector.

Figure 3:
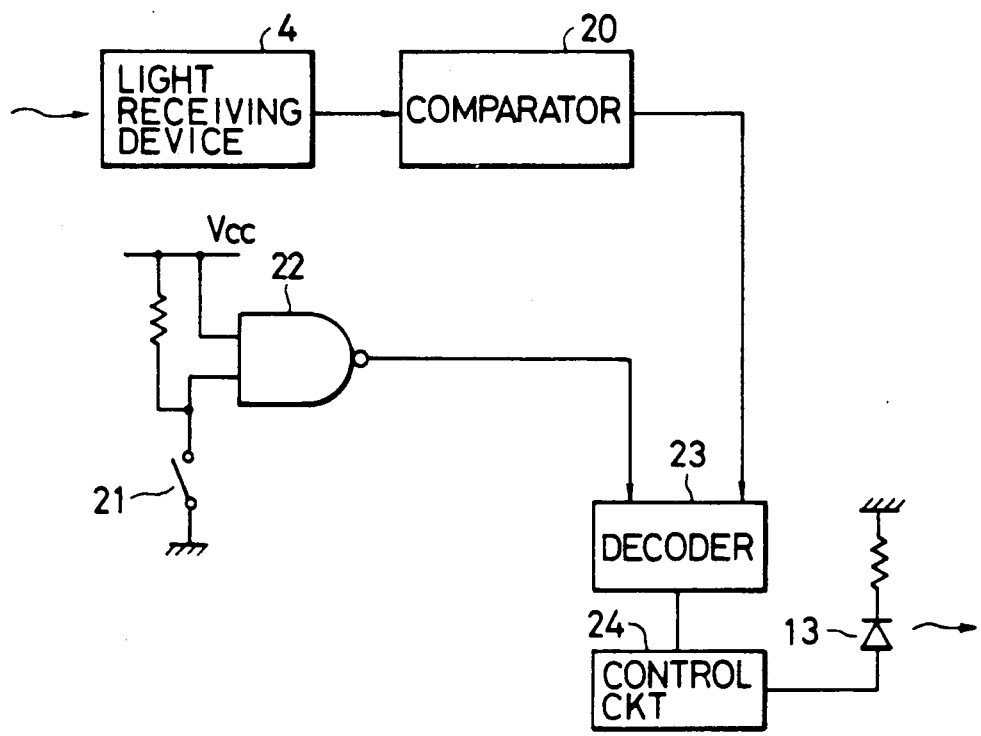
FIG. 3 is a block diagram showing the signal processing system of the first embodiment.

FIG. 3 is a block diagram showing a signal processing system. Reference numeral 20 designates a comparator for comparing the level from the light receiver 4 with a preset reference voltage, and reference numeral 21 denotes a switch operatively associated with the operating button 11 and adapted to be closed by selecting the recording and to be opened by selecting the reproduction. Reference numeral 22 designates a NAND gate which puts out a high level signal by the switch 21 being closed, and reference numeral 23 denotes a decoder which processes the recording medium as an unerasable recording medium by a high level signal being input thereto from the comparator 20 and processes the recording medium as an erasable recording medium by a low level signal being input thereto from the comparator 20 and which processes the recording medium as a recording medium by a high level signal being input thereto from the NAND gate 22 and processes the recording medium as a reproducing medium by a low level signal being input thereto from the NAND gate 22. Designated by 24 is a control circuit for controlling the current flowing to the light source 13, in accordance with the output from the decoder 23.

Figure 4:
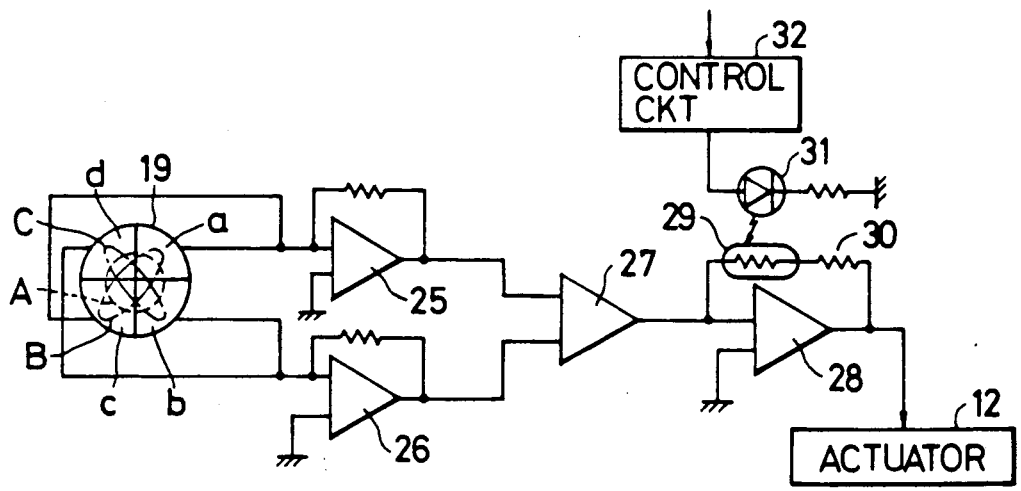
FIG. 4 is a block diagram of the automatic focus control system in the first embodiment.

FIG. 4 shows a block diagram of an automatic focus control system. Reference numerals 25 and 26 designate amplifiers for converting into voltages the sums of current signals obtained from the opposed detecting portions a, c and b, d of the four-division photodetector 19, reference numeral 27 denotes a differential amplifier for detecting the difference between the outputs from the amplifiers 25 and 26, reference numeral 28 designates an amplifier, reference numeral 29 denotes a photoconductive element which is series-connected with the feedback resistor 30 of the amplifier 28 and whose resistance value is variable by the quantity of light received, reference numeral 31 designates a light-emitting diode, reference numeral 32 denotes a control circuit for controlling the quantity of light emitted from the light-emitting diode 31 in accordance with the output of the decoder 23, and A, B and C indicates light distributions during in-focus, near-focus and far-focus, respectively.

Figure 5:
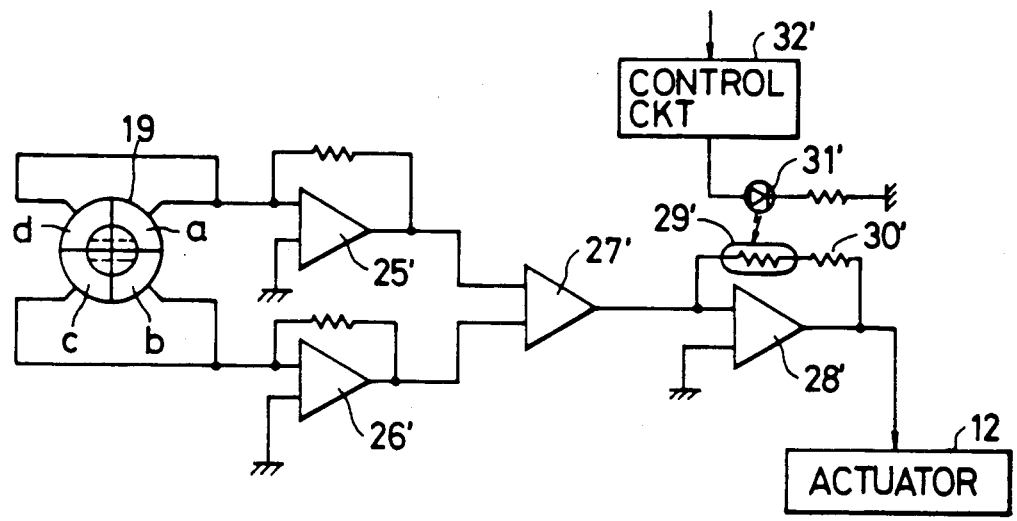
FIG. 5 is a block diagram of the tracking control system in the first embodiment.

FIG. 5, which shows a block diagram of a tracking control system is substantially similar to the case of the automatic focus control system (FIG. 4) with the only exception that the sums of the current signals from the detecting portions a, c and b, d of the four-division photodetector 19 are put out to amplifiers 25' and 26', respectively.

The embodiment shown in FIGS. 1 to 5 may accomplish recording and reproduction whether the optical recording medium 2 is an optical disc or a magneto-optical disc. Before the operation thereof is described, the principles of recording and reproduction of an optical disc and a magneto-optical disc will be described by reference to FIG. 6. In FIG. 6, reference character 2a designates an optical disc, reference character 2b denotes a magneto-optical disc, reference numeral 33 designates pits formed in the surface of the optical disc, and $\pm \theta_k$ is the Kerr rotation angle.

Figure 6A:
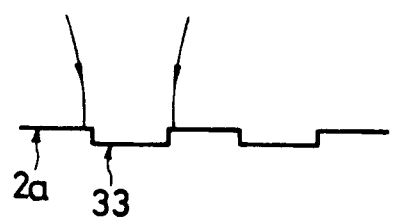
FIGS. 6A, 6B, 6C and 6D illustrate the principles of recording and reproduction of an optical disc and a magneto-optical disc.

Recording on the optical disc 2a shown in FIG. 6A may be accomplished by melting the thin metal film or the like of the surface of the optical disc 2a with the aid of the light-heat energy from the light source 13 to thereby form pits 33 or convex portions. Such an optical disc 2a is strong against the variation with time and can withstand long term storage, while it has the disadvantage that erasing of the record thereon is impossible. Also, the reproduction from this optical disc 2a may be accomplished by utilizing the interference between the reflected lights from the surface of the optical disc 2a around the pits 33 and from the pits 33. These reflected lights are light-to-dark-modulated by the presence of the pits 33 even if they do not pass through the polarizing plate 17 (FIG. 2) and, even if the polarized-light transmitting axis of the polarizing plate 17 is set at the dotted line position shown in FIG. 6B, there is a component passing through the polarizing plate 17 although there is a disadvantage that the quantity of light passing through the polarizing plate 17 decreases, and therefore, reproduction can be accomplished. If the wavelength of the reflected lights is $\lambda$, the interference between the reflected lights occurs most intensely when the depth of the pits 33 is $\lambda/4$, and thus the contrast of the reproduction signal becomes better.

Figure 6C:
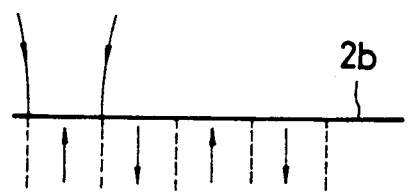
Figure 6B:
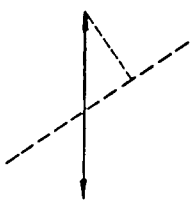
Figure 6D:
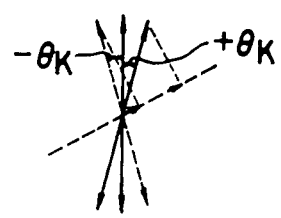

Recording on the magneto-optical disc 2b of GdTbFe, GdCO, GdDyCO, MnBi or the like may be accomplished by pre-applying a one-direction magnetic field to the magneto-optical disc 2b from the outside thereof as shown in FIG. 6C, regularizing the direction of magnetization, imparting light-heat energy to the disc to thereby locally cause inversion of magnetization, and changing the directions of magnetization (the upward and downward directions shown in FIG. 6C). Also, if a light flux whose plane of polarization is uniform is imparted to the thus recorded magneto-optical disc 2b, there will be obtained a reflected light whose plane of polarization has been rotated by the magneto-optic effect. This phenomenon is the well-known Kerr effect, and the rotation angle of the plane of polarization of light is called the Kerr rotation angle $\nu_k$. The rotation angle of the plane of polarization is reverse depending on the direction of magnetization, and becomes the Kerr rotation angle $-\theta_k$ and the kerr rotation angle $+\theta_k$ from the plane of polarization during incidence. For example, if the polarized-light transmitting axis of the polarizing plate 17 is set at the dotted line position shown in FIG. 6D, the components of the light flux passing through the polarizing plate 17 differ between the rotated light fluxes of the planes of polarization of the Kerr rotation angle $+\theta_k$ and the Kerr rotation angle $-\theta_k$, and the difference therebetween provides a variation in quantity of light which can be read out as the reproduction signal by the four-division photodetector 19.

When recording and reproduction are to be effected on two kinds (optical disc and magneto-optical disc) of optical recording mediums 2 in this manner, it will be seen that recording and reproduction can be accomplished by increasing or decreasing the output intensity of the light source 13 so that light-heat energy may be the energy which permits information to be recorded on or reproduced from the respective optical recording mediums 2. These two typical optical recording mediums 2 usually differ in reflection factor. Accordingly, the kinds thereof can be discriminated by measuring the difference in reflection factor between the two optical recording mediums, and an output intensity of the light source 13 suitable for the respective recording mediums can be provided. Even if the two optical recording mediums have the same reflection factor, they can be discriminated by pre-attaching labels or the like different in reflection factor to the substrates in accordance with the kinds of the optical recording mediums.

Also, in the case of an apparatus of the type in which, as will later be described, the light emitted from a light projecting device and passed through an optical recording medium is detected to thereby discriminate the medium, the surface of the optical recording medium can be coated with a dielectric film or the like in accordance with the kind of the optical recording medium, whereby the medium can be discriminated by the difference between the detected lights.

Operation of the present embodiment will now be described. The cover 1 is opened, whereby the optical recording medium 2 is set, and then the cover 1 is closed. Subsequently, recording or reproduction is manually selected by means of the operating button 11. Thus, light is projected from the light projecting device 3 onto the optical recording medium 2 by an unshown circuit, and the reflected light therefrom is received by the light receiver 4. The output from the light receiver 4 is applied as an input to the comparator 20 and is compared with the reference voltage of the comparator 20. For example, when the light receiver 4 receives the reflected light from the unerasable optical recording medium 2, the output from the comparator 20 assumes a high level and is applied as an input to the decoder 23. Also, if recording is selected by means of the operating button 11, the switch 21 is closed in response thereto and a high level signal is put out from the NAND gate 22 to the decoder 23. Thus, a high level signal is applied as an input to the decoder 23 from the comparator 20 and, with the optical recording medium as an unerasable recording medium, a high level signal is applied as an input from the NAND gate 22 and therefore, this signal is processed as recording and put out to the control circuit 24.

The output from the decoder 23 includes four cases: (I) recording - unerasable recording medium, (II) recording - erasable recording medium, (III) reproduction - unerasable recording medium, and (IV) reproduction - erasable recording medium, and in the control circuit 24, the current flowing to the light source 3 is controlled in accordance with (I) to (IV) above. For example, when the mode is the recording mode and the recording medium is a low sensitivity recording medium (for example, (I)), it is modulated and driven by a high current in accordance with the information signal. When the mode is the reproduction mode (for example, (III)), the output of the decoder is controlled to an output below the recording threshold value and the light source 13 is caused to continuously emit light. When the mode is the recording or the reproduction mode and the recording medium is a high sensitivity recording medium (for example, (II) or (IV)), the output of the decoder is controlled to a level lower than the aforementioned current value (for example, in the case of (I) or (III)). The current values in these four cases are preset to their optimum values by the control circuit 24. Accordingly, the output intensity and waveform of the light source 13 are controlled by the control circuit 24 so that they become the output intensity and waveform corresponding to (I)–(IV).

The beam from the light source 13 such as a semiconductor laser is made into a desired light flux distribution by the collimation lens 14, passes through the beam splitter 15 and is reflected and deflected by the total reflection mirror 16, whereafter it is made into a minute spot by the lens 7 and condensed on the optical recording medium 2.

The reflected light from the optical recording medium 2 again passes through the lens 7 and via the total reflection mirror 16 and is divided by the beam splitter 15. The divided light flux passes through the polarizing plate 17, and then passes through the astigmatic optical system 18 to the four-division photodetector 19. Several types of actuator 12 have already been proposed, but generally, use is made of one utilizing a voice coil mechanism.

According to the present embodiment, light is projected from the light projecting device 3 onto the optical recording medium 2, and the reflected light therefrom is received by the light receiver 4 and the kind of the optical recording medium 2 is automatically discriminated by the decoder 23 and control circuit 24, whereby the output intensity of the light source 13 is controlled and therefore, information can be recorded and reproduced on any of the optical recording mediums 2 having different characteristics. The present embodiment is further designed such that automatic focus control or tracking control can be accomplished always stably irrespective of the optical recording medium. This will be described hereinafter.

Automatic focus control and tracking control are effected by a combination of the astigmatic optical system 18 and the four-division photodetector 19, and the case of automatic focus control will first be described. In FIG. 4, the current signals from the opposed detecting portions a and c of the four-division photodetector 19 are added to each other and applied as an input to the amplifier 25, and the current signals from the detecting portions b and d of the four-division photodetector 19 are added to each other and applied as an input to the amplifier 26. The amplifiers 25 and 26 convert the respective sums of the current signals into voltages and put out them to the differential amplifier 27. The differential amplifier 27 detects the difference between the two voltages, and this difference is an error signal for automatic focus control.

If the amount of surface vibration of the optical recording medium 2 is I(jw) and the transmission functions of the four-division photodetector 19, the amplifiers 25, 26, the differential amplifier 27, the amplifier 28 and the actuator 12 are OP(jw), T(jw), A(jw), P(jw) and F(jw), respectively, and the amount of movement of the controlled lens 7 is O(jw), then it is known that the relation of the servo loop is $$\frac{I(jw) - O(jw)}{I(jw)} = \frac{1}{1 + OP(jw) \cdot T(jw) \cdot A(jw) \cdot P(jw) \cdot F(jw)}$$

where w is the angular frequency. The difference I(jw)−0(jw) between the amount of surface vibration I(jw) and the amount of movement 0(jw) of the lens 7 controlled by the servo loop is a follow-up error, and the transmission functions of the four-division photodetector 19, the actuator 12 and the amplifiers 25 to 28 are determined so that the value of the follow-up error is within the depth of focus of the lens 7.

However, if the output intensity of the light source 13 is varied in accordance with the kind of the optical recording medium 2 and reproduction or recording, the quantity of reflected light entering the four-division photodetector 19 also varies and the characteristic of the transmission function OP(jw) thereof also changes. Accordingly, the servo loop control characteristic also changes and the follow-up performance is reduced. To solve this problem, the gain of the amplifier 28 is changed. Any variation in the transmission function OP(jw) of the four-division photodetector 19 can be corrected by the variation in the transmission function P(jw) of the amplifier 28. That is, for example, the control circuit 32 controls the quantity of light emitted from the light-emitting diode 31 in accordance with the output of the decoder of FIGS. 3, 8 and 9, thereby varying the resistance value of the photoconductive element 29 and therefore, the servo loop control characteristic can always be maintained constant even if any variation in quantity of light is caused by the kind of the optical recording medium 2 and recording or reproduction.

Accordingly, by the difference between the sum of the current signals from the opposed detecting portions a and c of the four-division photoconductor 19 and the sum of the current signals from the detecting portions b and d of the four-division photodetector 19 being detected by the differential amplifier 27, the information of in-focus (light distribution A) is obtained when the difference output is zero, the information of near-focus (light distribution B) is obtained when the difference output is negative, and the information of far-focus (light distribution C) is obtained when the difference output is positive, and the linearity of such information relative to the focus diviation is always kept invariable. Such information is put out through the amplifier 28 to the actuator 12 on which the lens 7 is mounted, whereby automatic focus control is effected.

Next, before the tracking control is described, the principle of tracking error signal detection will be described by reference to FIG. 7. In FIG. 7, reference numeral 34 designates pits, reference numeral 35 denotes signal tracks, reference numerals 36, 37, 38 and 39 designate beam spots, reference numerals 40 and 41 denote photodetectors, and reference numeral 42 designates a two-division photodetector.

The tracking error signal detecting system for effecting tracking control is generally classified into the three-beam system and the one-beam system. Description will first be made of the three-beam system shown in FIGS. 7A and 7B. Three beam spots 36, 37 and 38 are made on the optical recording medium 2 by a diffraction grating or the like inserted in the optical path. The beam spot 36 lies at the center of a signal track 35, the beam spot 37 is of such a degree that the left half thereof overlaps the signal track 35, and the beam spot 38 is of such a degree that the right half thereof overlaps the signal track 35. The space on the signal track 35 and the space between the signal track 35 and the adjacent signal track differ in reflection factor and therefore, if any track deviation occurs, the quantities of reflected light from the beam spots 37 and 38 will differ. If these lights are received by two photodetectors 40 and 41 as shown in FIG. 7B and the difference therebetween is detected, the direction of deviation in the positive or the negative sense and the degree of deviation by the amplitude thereof can be detected.

Figure 7A:
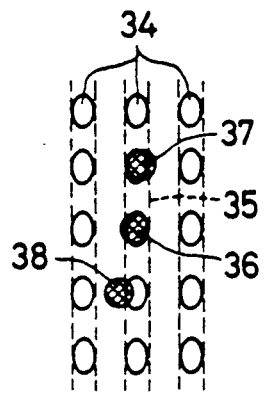
FIGS. 7A, 7B, 7C and 7D illustrate the principle of tracking error signal detection.
Figure 7C:
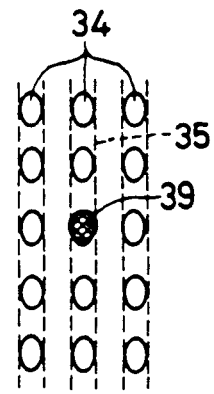
Figure 7B:
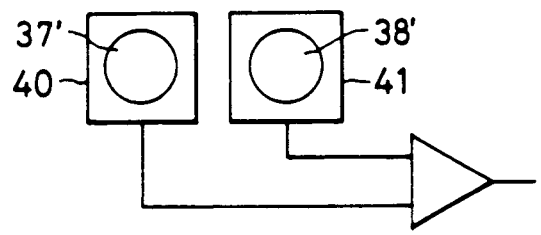
Figure 7D:
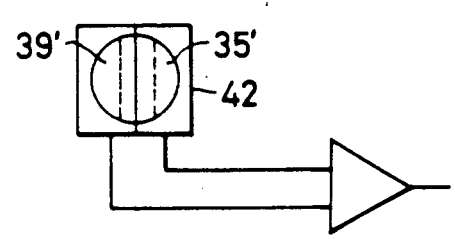

In the one-beam system, as shown in FIG. 7C, the signal track 35 is illuminated by one beam spot 39. A two-division photodetector 42 is placed at a position which is substantially in conjugate relationship (imaging relationship) with the plane of the signal track 35 through a lens system. Designated by 39' on the two-division photodetector 42 is the image of a beam spot 39 on the optical recording medium 2, and the image of the signal track 35 is designated by 35'. When any track deviation occurs, the image 39' will move to left and right and a difference will occur between the outputs from the respective photodetector elements, and this will provide a tracking error signal.

In the one-beam system, where the signal track 35 is formed by a groove, a method is also known whereby detection is effected from a variation in the diffracted light in the groove, but again in this method, the difference between the quantities of light from two photodetector elements is detected.

In the present embodiment, use has been made of the one-beam system and tracking control has been effected by a four-division photodetector common to focus control.

Again in the case of tracking control, as in the case of automatic focus control, when the output intensity of the light source 13 is varied in accordance with the kind of the optical recording medium 2 and reproduction, the quantity of reflected light entering the four-division photodetector 19 also varies and a variation occurs in the servo loop control characteristic and thus, reduction in the follow-up performance is caused. Therefore, in FIG. 5, as in the case of the aforedescribed automatic focus control, the transmission function P(jw) of the amplifier 28' is varied, whereby any variation in the transmission function OP(jw) of the four-division photodetector 19 can be corrected and the servo loop control characteristic can be kept constant.

Thus, the tracking error signal obtained by the difference between the sum of the current signals from the detecting portions a and d of the four-division photodetector 19 and the sum of the current signals from the detecting portions b and c of the four-division photodetector 19 keeps the linearity relative to the track deviation always invariable.

According to the present embodiment, light is projected from the light projecting device 3 onto the optical recording medium 2, the reflected light therefrom is received by the light receiver 4, the kind of the optical recording medium 2 is automatically discriminated by the decoder 23 and control circuit 24 to control the output intensity of the light source 13, and the servo loop control characteristic variable in accordance with any variation in the output intensity is corrected by the control circuits 32, 32', the light-emitting diodes 31, 31' and the photoconductive elements 29, 29'.

Figure 8:
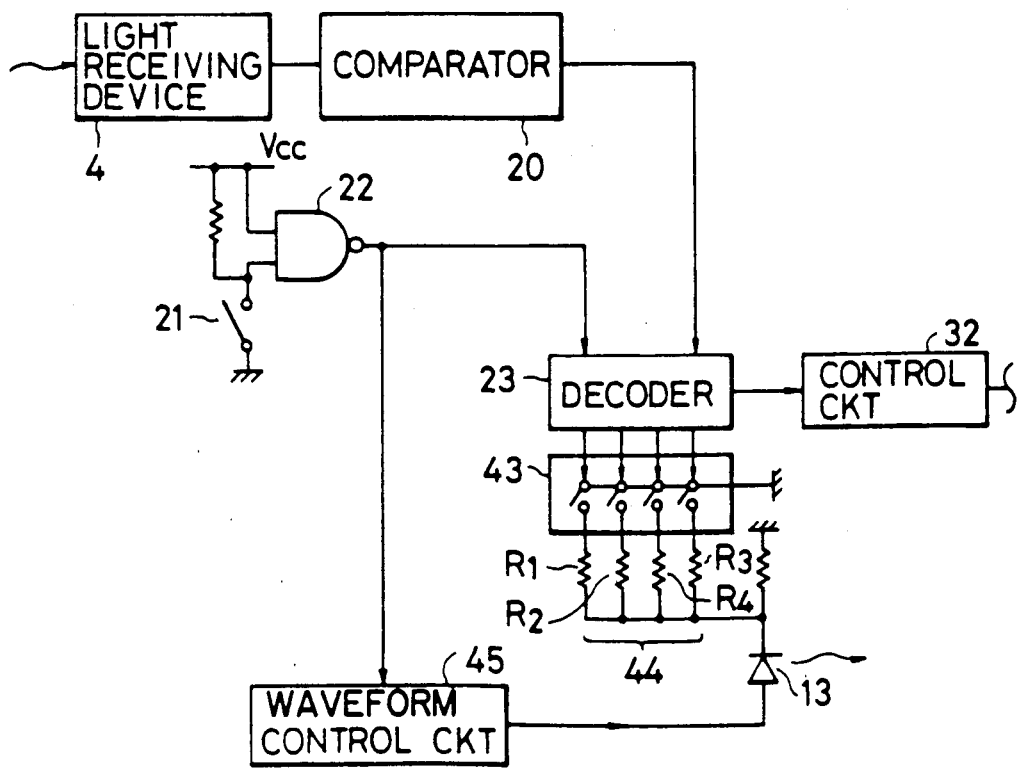
FIGS. 8 and 9 are block diagrams showing modifications of the signal processing system in the first embodiment.

FIG. 8 shows a modification of the signal processing system in the first embodiment. In FIG. 8, parts similar to those of FIGS. 1, 3, 4 and 5 are given similar reference characters. Reference numeral 43 designates an analog switch adapted to be closed and opened in response to the output from the decoder 23, and reference numeral 44 denotes a resistance train in which different resistance values $R_1$, $R_2$, $R_3$ and $R_4$ are provided in parallel, the resistance values $R_1$, $R_2$, $R_3$ and $R_4$ being preset so as to be optimum for the aforementioned four cases (I), (II), (III) and (IV). Designated by 45 is a waveform control circuit.

Operation of this embodiment will now be described. The reflected light from the optical recording medium 2 is received by the light receiver 3 and the output level thereof is put out to the comparator 20. The comparator 20 compares the output level from the light receiver 4 with a reference voltage and, for example, when the light receiver 4 receives the reflected light from the unerasable recording medium, the output from the comparator 20 assumes a high level and is applied as an input to the decoder 23. Also, the switch 21 is closed in response to the selection of recording by means of the operating button 11, and the output from the NAND gate 22 assumes a high level and is applied as an input to the decoder 23 and the waveform control circuit 45. The high level (unerasable recording medium) signal from the comparator 20 and the high level (recording) signal from the NAND gate 22 are applied as inputs to the decoder 23, so that the resistance value $R_1$ corresponding to the case (I) is selected by the analog switch 43 to change the output intensity of the light source 13.

On the other hand, the high level (recording) signal from the NAND gate 23 is applied as an input, whereby the waveform control circuit 45 is operated to modulate the current flowing to the light source 13 and provide a waveform suitable for recording on the unerasable recording medium.

During reproduction, the resistance value $R_3$ is selected to change the output intensity of the light source and the waveform control circuit 45 causes a predetermined level of current to flow and also causes the light source 13 to produce a predetermined level of beam suitable for reproducing from the unerasable recording medium. The automatic focus control and tracking control method is similar to what has been described in connection with FIGS. 4 and 5, and therefore need not be described here.

Again in the present signal processing system, the kind of the optical recording medium 2 is automatically discriminated by the comparator 20, decoder 23, analog switch 43 and waveform control circuit 45 to control the output intensity and waveform of the light source 13 and therefore, information can be recorded and reproduced on any of the optical recording mediums 2 different in characteristic.

Figure 9:
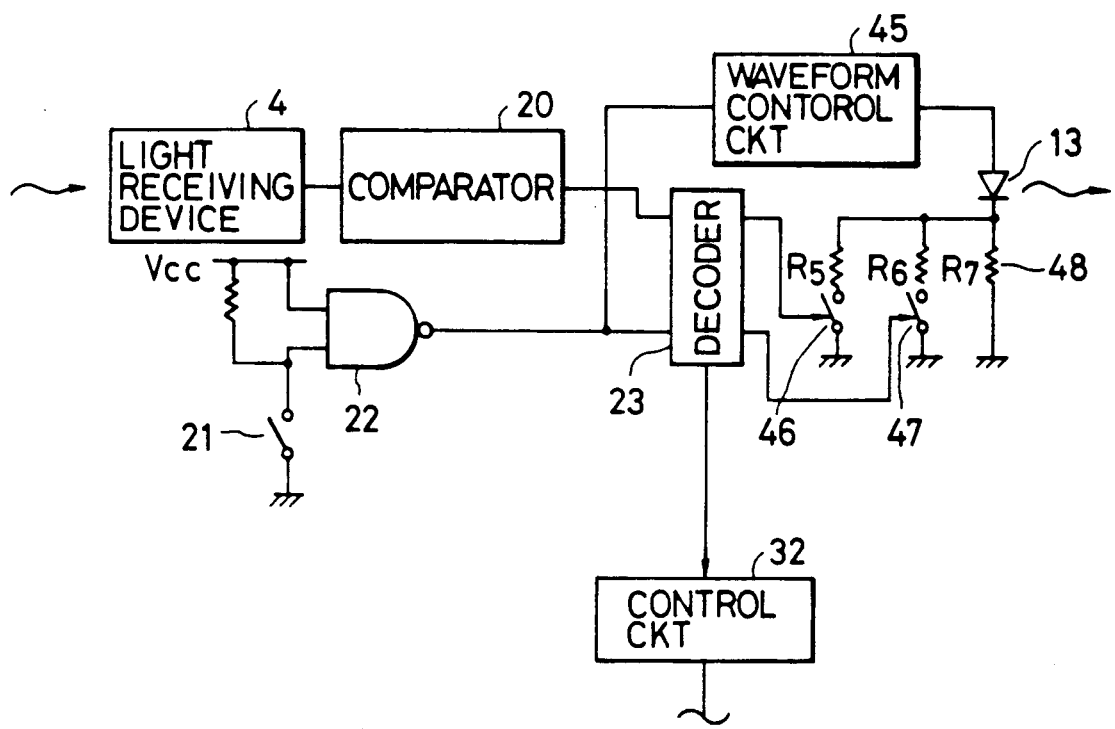

FIG. 9 shows another modification of the signal processing system. In FIG. 9, parts similar to those of FIG. 8 are given similar reference characters. The difference of this embodiment from the embodiment of FIG. 8 lies in the method of controlling the current flowing to the light source, and the composite resistance value $R_0$ of a resistance train 48 comprising resistance values $R_5$, $R_6$ and $R_7$ is changed by a combination of switches 46 and 47. That is, if setting is made such that the switches 46 and 47 are closed by high level signals being put out from the comparator 20 and the NAND gate 22 and are opened by low level signals being put out from the comparator 20 and the NAND gate 22, the composite resistance value $R_0$ of the resistance train 48 can assume the following four values:

$$\frac{1}{R_0} = \frac{1}{R_5} + \frac{1}{R_6} + \frac{1}{R_7} \quad (1)$$

$$\frac{1}{R_0} = \frac{1}{R_5} + \frac{1}{R_7} \quad (2)$$

$$\frac{1}{R_0} = \frac{1}{R_6} + \frac{1}{R_7} \quad (3)$$

$$\frac{1}{R_0} = \frac{1}{R_7} \quad (4)$$

Accordingly, four types of current control can be accomplished and output intensities suitable for respective cases can be provided.

According to the present signal processing system, the kind of the optical recording medium 2 can be automatically discriminated by the comparator 20, waveform control circuit 45, switches 46, 47 and resistance train 30 to control the output intensity and waveform of the light source and therefore, information can be recorded and reproduced on any of the optical recording mediums 2 different in characteristic.

In the present embodiment, means for changing the output intensity of the light source 13 is used as the beam intensity changing means, but alternatively, design may be made such that one of four light sources different in output intensity is selected, or light-decreasing means such as a stop or a polarizing plate may be provided in the optical path so that the intensity of the beam applied to the optical recording medium is changed. Such an embodiment will be shown below.

Figure 10:
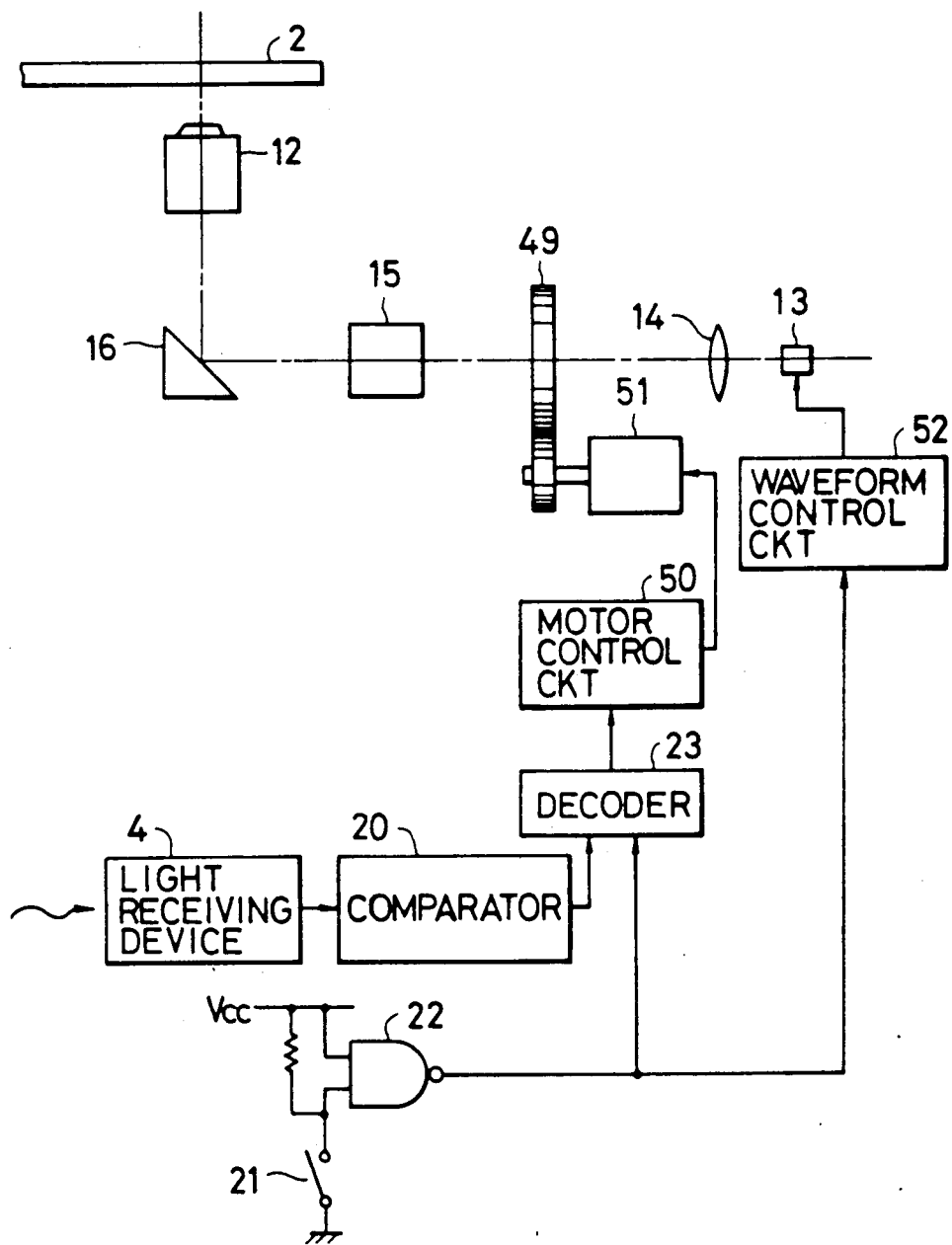
FIG. 10 is a block diagram showing the construction of a second embodiment of the present invention.

FIG. 10 is a block diagram showing the construction of a second embodiment of the present invention. In FIG. 10, members similar to those of FIGS. 1-3 are given similar reference characters and need not be described in detail.

The present embodiment is such that the light energy applied to the optical recording medium 2 is controlled by a polarizing plate 49 inserted between the collimation lens 14 and the beam splitter 15. Reference numeral 50 designates a motor control circuit for driving a stepping motor 51 by the output from the decoder 23. The polarizing plate 49 is rotated by this motor control circuit. Reference numeral 52 denotes a waveform control circuit which modulates the current flowing to the light source 13 if, for example, the output from the NAND gate 22 is at high level (recording) and renders the current flowing to the light source 13 constant if said output is at low level (reproduction).

The operation of the present embodiment is entirely the same as that of the first embodiment up to the decoder 23, that is, the motor control circuit 50 rotates the polarizing plate 49 to the preset respective optimum angles in accordance with the kind of the optical recording medium and the distinction between recording and reproduction to thereby limit the quantity of light passed through the polarizing plate 49 and change the intensity of the beam applied to the optical recording medium.

According to the present embodiment, light is projected from the light projecting device 3 onto the optical recording medium 2, the reflected light therefrom is received by the light receiver 4, the kind of the optical recording medium 2 is discriminated by the decoder 23 and the polarizing plate 49 can be rotated so as to automatically provide an optimum quantity of light and therefore, information can be recorded and reproduced on any of the optical recording mediums 2 different in characteristic.

Figure 11:
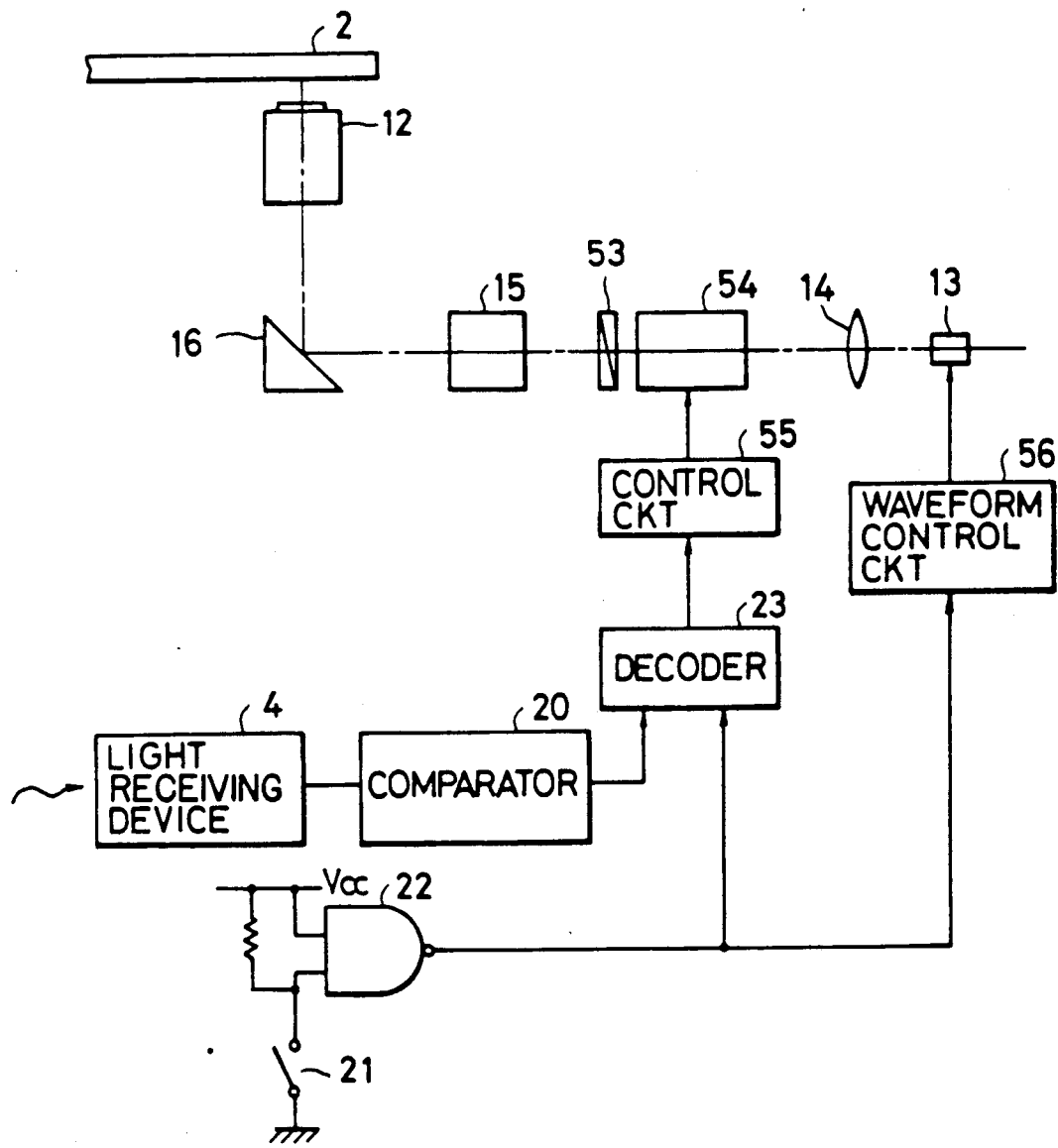
FIG. 11 is a block diagram showing the construction of a third embodiment of the present invention.

FIG. 11 is a block diagram showing the construction of a third embodiment of the present invention. In FIG. 11, members similar to those of FIGS. 1–3 are given similar reference characters and need not be described in detail. Reference numeral 53 designates a polarizing plate, and reference numeral 54 denotes a Faraday rotator which functions to rotate the plane of polarization of the light flux and control the light energy applied to the optical recording medium 2, by a combination with the polarizing plate 53. Reference numeral 55 designates a control circuit for changing the magnitude of the magnetic field imparted to the Faraday rotator 54 in accordance with the signal from the decoder 23, and reference numeral 56 denotes a waveform control circuit which modulates the current flowing to the light source 13 if, for example, the output from the NAND gate 22 is at high level (recording) and which renders the current flowing to the light source 13 constant if said output is at low level (reproduction).

The operation of the present embodiment is entirely the same as that of the first embodiment up to the decoder 23, that is, the control circuit 55 changes the magnitude of the magnetic field imparted to the Faraday rotator 54 in accordance with the kind of the optical recording medium and the distinction between recording and reproduction and rotates the plane of polarization of the light flux to thereby limit the quantity of light passed through the polarizing plate 53. The angles of rotation of the Faraday rotator 54 in the respective cases are preset to predetermined angles for which the quantity of light passed through the polarizing plate 53 assumes an optimum value, by the control circuit 55. As the Faraday rotator 54, use is made of special glass doped with yttrium iron garnet (YIG) or rare earth materials, and the axis of easy magnetization is disposed parallel to the optic axis, and by applying a magnetic field thereto, the plane of polarization of the light can be rotated (Faraday effect). If the angle formed between the transmitting axis of the polarizing plate 53 and the plane of polarization of the light is $\theta$, the intensity of the transmitted light is proportional to $\cos\nu^2$. Also, the angle of rotation of the plane of polarization of the light by the Faraday effect is proportional to the intensity of the magnetic field. Accordingly, the intensity of the applied energy is controlled by the Faraday rotator 54 and the polarizing plate 53 so as to provide optimum quantities of light corresponding to the respective cases.

According to the present embodiment, light is projected from the light projecting device 3 onto the optical recording medium, the reflected light therefrom is received by the light receiver 4, the kind of the optical recording medium 2 is discriminated by the decoder 23 and an optimum quantity of light can be automatically provided by the Faraday rotator 54 and polarizing plate 53 and therefore, information can be recorded and reproduced on any of the optical recording mediums 2 different in characteristic.

Again in the second and third embodiments, as in the first embodiment, the signal from the decoder is applied as an input to a focus control system or a tracking control system, not shown, to vary the transmission function of the servo loop, thereby stabilizing the control operation.

The present invention is applicable not only to the aforedescribed magneto-optical recording medium and the medium for recording by formation of pits, but also to a combination of various mediums such as mediums for recording information thereon by utilizing the variation in reflection factor caused during the phase transition from non-crystalloid to crystal, and is not always limited to a combination of an erasable recording medium and an unerasable recording medium. These mediums are not limited to the disc-like shape, but may be of any other shape such as tape-like or card-like shape. Further, in the embodiments illustrated, the kind of the medium has been discriminated by the difference in reflection factor between the optical recording mediums, but in an apparatus wherein a light beam is applied to an optical recording medium and information is reproduced by the light transmitted therethrough, a light projecting device and a light receiver may be disposed at the opposite sides of the medium to detect the light transmitted through the optical recording medium, thereby discriminating the kind of the medium.

WHAT I CLAIM IS:

1. An information recording and/or reproducing apparatus in which a beam emitted from a light source is applied to an optical recording medium to thereby record and/or reproduce information thereon, characterized by:

light projecting means for projecting a medium-detecting-light flux onto the surface of said optical recording medium;

discriminating means for detecting the level of the reflected light or the transmitted light of said medium-detecting-light flux from said optical recording medium and discriminating between optical recording mediums having different characteristics by the detected level; and intensity changing means for changing the intensity of said beam on the surface of said optical recording medium in accordance with the discrimination of said discriminating means.

2. An information recording and/or reproducing apparatus according to claim 1, wherein said intensity changing means includes means for changing the output intensity of said light source.

3. An information recording and/or reproducing apparatus according to claim 2, wherein said intensity changing means comprises a semiconductor laser as a light source and a switch for changing over the resistance value in a driving circuit of said semiconductor laser.

4. An information recording and/or reproducing apparatus according to claim 1, wherein said light source supplies a polarized beam and said intensity changing means comprises a polarizing plate rotatably disposed in the optical path from said light source to said optical recording medium, and polarizing-plate rotating means for controlling the angle of rotation of said polarizing plate in accordance with the discrimination of said discriminating means.

5. An information recording and/or reproducing apparatus according to claim 4, wherein said polarizing-plate rotating means comprises a stepping motor for rotating said polarizing plate and a motor control circuit for driving said motor.

6. An information recording and/or reproducing apparatus according to claim 1 wherein said light source supplies a polarized beam and said intensity changing means comprises a plane-of-polarization rotating element disposed in the optical path from said light source to said optical recording medium, a polarizing plate disposed in said optical path on the output side of said plane-of-polarization rotating element, and plane-of-polarization control means for controlling the angle of rotation of the plane of polarization of said plane-of-polarization rotating element in accordance with the discrimination of said discriminating means.

7. An information recording and/or reproducing apparatus according to claim 6, wherein said plane-of-polarization rotating element is a Faraday rotator and said plane-of-polarization control means comprises a control circuit for changing the magnitude of a magnetic field imparted to said Faraday rotator.

8. An information recording and/or reproducing apparatus according to claim 1, wherein said intensity changing means further changes the intensity of said beam on the surface of said optical recording medium in accordance with the selection of a recording mode or a reproducing mode.

9. An information recording and/or reproducing apparatus according to claim 1, wherein said discriminating means comprises a light receiver for receiving said medium-detecting-light flux and a comparator for comparing the level from said light receiver with a reference voltage.

10. An information recording and/or reproducing apparatus according to claim 1, wherein said recording mediums having different characteristics include an erasable recording medium and an unerasable recording medium.

11. An information recording and/or reproducing apparatus provided with a light source generating a beam to an optical recording medium and at least one of automatic focus control means and tracking control means, characterized by:
light projecting means for projecting a medium-detecting-light flux onto the surface of said optical recording medium;
discriminating means for detecting the level of the reflected light or the transmitted light of said medium-detecting-light flux from said optical recording medium and discriminating between optical recording mediums having different characteristics by the detected level;
intensity changing means for changing the intensity of said beam on the surface of said optical recording medium in accordance with the discrimination of said discriminating means; and,
characteristic correcting means for changing the transmission function of a part of a servo loop of at least one of said control means in accordance with the intensity change of said beam.

12. An information recording and/or reproducing apparatus according to claim 11, wherein said intensity changing means further changes the intensity of said beam on the surface of said optical recording medium in accordance with the selection of a recording mode or a reproducing mode.

13. An information recording and/or reproducing apparatus according to claim 11, wherein said characteristic correcting means comprises a light-emitting diode, a control circuit for controlling the quantity of light emitted from said light-emitting diode in accordance with the intensity change of said beam, and a photoconductive element disposed at a part of said servo loop and having a resistance value variable in accordance with the quantity of light emitted from said light-emitting diode.

14. An information recording and/or reproducing apparatus according to claim 11, wherein said recording mediums having different characteristics include an erasable recording medium and an unerasable recording medium.

15. An information recording and/or reproducing apparatus comprising:
means for irradiating an optical recording medium, selected from a plurality of kinds of optical recording mediums having different characteristics, with a light beam to effect at least one of information recording and reproduction;
servo means for carrying out at least one of focusing servo and tracking servo of said light beam relative to the optical recording medium, said servo means including a servo loop having a settable transmission function;
means for identifying the selected kind of optical recording medium prior to recording and/or reproduction, said identifying means identifying the selected kind by projecting a light onto the recording medium and detecting the reflected light or the transmitted light from the recording medium;
means for controlling the energy to be supplied to the optical recording medium by the light beam during recording and/or reproduction in accordance with the identification made by said identifying means; and
means for setting the transmission function of the servo loop of said servo means in accordance with the identification made by said identifying means.

16. An information recording and/or reproducing apparatus according to claim 15, wherein the optical recording mediums having different characteristics include an erasable recording medium and an unerasable recording medium.

17. An information recording and/or reproducing apparatus according to claim 15, wherein said identifying means projects the light beam to an area provided on the recording medium and bearing information for showing the kind thereof.

18. An apparatus for selectively effecting information recording and/or reproducing by applying a light beam to an optical recording medium having on its surface a thin film for information recording and/or reproducing selected from a plurality of types of optical recording media having different recording sensitivities, said apparatus comprising:
light source means for radiating the light beam;
identifying means for automatically identifying the type of the selected medium prior to recording and/or reproducing information, said identifying means having a light receiving means and irradiating the thin film of the medium with a light beam to identify the type of medium by detecting alight beam reflected by or transmitted through the thin film to the light receiving means;
controlling means for controlling the intensity of the light beam radiated by said light source means to a set one of a plurality of non-zero values, different from each other, in accordance with the type of the medium identified by said identifying means; and means for irradiating the medium with the light beam radiated from said light source means to effect recording and/or reproducing of information.

19. An apparatus according to claim 18, wherein said light source means includes a semiconductor laser and said controlling means includes current variation means for changing a current flowing in said semiconductor laser in accordance with the type of optical recording medium.

20. An apparatus according to claim 19, wherein said controlling means comprises a power source means for supplying the current to the semiconductor laser, a variable resistor serially connected with the semiconductor laser and switching means for switching a resistance value of the variable resistor.

21. An apparatus according to claim 18, wherein said optical recording mediums have different characteristics including an erasable recording medium and a non-erasable recording medium.

* * * * *

UNITED STATES PATENT AND TRADEMARK OFFICE
CERTIFICATE OF CORRECTION

PATENT NO. : 5,042,020

DATED : August 20, 1991

INVENTOR(S) : KIYONOBU ENDO

It is certified that error appears in the above-identified patent and that said Letters Patent is hereby corrected as shown below:

On the Title page,

AT [54] TITLE

"MEDIUM" should read --MEDIUMS--. (Second occurrence)

AT [56] REFERENCES CITED

U.S. Patent Documents,
"Okara et al." should read --Ohara et al.--.

In the Drawings
SHEET 5 OF 7

FIG. 9, "CONTOROL" should read --CONTROL--.

COLUMN 1

Line 7, "MEDIUM This" should read
--MEDIUMS ¶ This--.
Line 38, "Also," should read --Also, although--.
Line 43, "erasable," should read --erasable--.
Line 48, "disadvantages" should read --disadvantage--.
Line 58, "application of the information" should read
--the application of information--.
Line 62, "are buffer memories" should read
--is a buffer memory--.

COLUMN 2

Line 2, "different in characteristic." should read
--having different characteristics.--.
Line 11, "any" should be deleted.
Line 12, "of" should be deleted.
Line 26, "different in characteristic" should read
--having different characteristics--.

UNITED STATES PATENT AND TRADEMARK OFFICE
CERTIFICATE OF CORRECTION

PATENT NO. : 5,042,020
DATED : August 20, 1991
INVENTOR(S) : KIYONOBU ENDO

It is certified that error appears in the above-identified patent and that said Letters Patent is hereby corrected as shown below:

COLUMN 3

Line 4, "medium, 2" should read --medium 2--.
Line 9, "optical," should read --optical--.
Line 19, "to" should be deleted.

COLUMN 4

Line 3, "indicates" should read --indicate--.
Line 29, "long term" should read --long-term--.
Line 59, "disc 2b ," should read --disc 2b,--.
Line 63, "angle $v_k$." should read --angle $\theta_k$.--.
Line 66, "kerr" should read --Kerr--.

COLUMN 6

Line 7, "(III)," should read --(III)),--.
Line 12, "(IV)," should read --(IV)),--.
Line 15, (III)." should read --(III)).--.
Line 63, "out them" should read --them out--.

COLUMN 7

Line 52, "diviation" should read --deviation--.

COLUMN 8

Line 26, "to" should be deleted.

UNITED STATES PATENT AND TRADEMARK OFFICE
CERTIFICATE OF CORRECTION

PATENT NO. : 5,042,020

DATED : August 20, 1991

INVENTOR(S) : KIYONOBU ENDO

It is certified that error appears in the above-identified patent and that said Letters Patent is hereby corrected as shown below:

COLUMN 9

Line 19, "receiver 3" should read --receiver 4--.
Line 59, "differ-" should read
    --having different characteristics.--.
Line 60, "ent in characteristic." should be deleted.

COLUMN 10

Line 27, "train 30" should read --train 48--.
Line 30, "different in characteristic." should read
    --having different characteristics.--.

COLUMN 11

Line 9, "different in" should read
    --having different characteristics.--.
Line 10, "characteristic." should be deleted.
Line 52, "$cosv^2$." should read --$cos\theta^2$.--.
Line 68, "different in characteristic." should read
    --having different characteristics.--.

COLUMN 12

Line 28, "WHAT I CLAIM IS:" should read
    --What I claim is:--.

COLUMN 13

Line 4, "claim 1" should read --claim 1,--.

UNITED STATES PATENT AND TRADEMARK OFFICE
CERTIFICATE OF CORRECTION

PATENT NO. : 5,042,020
DATED : August 20, 1991
INVENTOR(S) : KIYONOBU ENDO

It is certified that error appears in the above-identified patent and that said Letters Patent is hereby corrected as shown below:

COLUMN 14

Line 63, "alight" should read --a light--.

Signed and Sealed this

Fifteenth Day of June, 1993

Attest:

MICHAEL K. KIRK

Attesting Officer

Acting Commissioner of Patents and Trademarks